US007437725B1

(12) United States Patent
Chang et al.

(10) Patent No.: US 7,437,725 B1
(45) Date of Patent: Oct. 14, 2008

(54) PROCESSING TECHNIQUES FOR SERVERS HANDLING CLIENT/SERVER TRAFFIC AND COMMUNICATIONS

(75) Inventors: Leo S. Chang, San Francisco, CA (US); Matthew J. Mucklo, Oakland, CA (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 10/672,236

(22) Filed: Sep. 25, 2003

Related U.S. Application Data

(63) Continuation of application No. 09/524,047, filed on Mar. 13, 2000, now abandoned.

(60) Provisional application No. 60/114,712, filed on Jan. 4, 1999.

(51) Int. Cl.
*G06F 9/46* (2006.01)

(52) U.S. Cl. .................. 718/100; 718/102; 718/104; 709/201; 709/202; 709/203

(58) Field of Classification Search ................. 718/100, 718/102, 104; 709/201–203, 217, 219, 226–229, 709/200
See application file for complete search history.

(56) References Cited

U.S. PATENT DOCUMENTS 5,109,512 A      4/1992   Bahr et al.

(Continued)

OTHER PUBLICATIONS

"Annotated reference list agents" Blight, D.C., WESCANEX '97 Proceedings, May 22-23, 1997, pp. 7-12.

(Continued)

*Primary Examiner*—Meng-Ai An
*Assistant Examiner*—Lilian Vo
(74) *Attorney, Agent, or Firm*—Davidson Berquist Jackson & Gowdey LLP

(57) ABSTRACT

The present invention relates to a system for handling client/server traffic and communications pertaining to the delivery of hypertext information to a client. The system includes a central server which processes a request for a web page from a client. The central server is in communication with a number of processing/storage entities, such as an annotation means, a cache, and a number of servers which provide identification information. The system operates by receiving a request for a web page from a client. The cache is then examined to determine whether information for the requested web page is available. If such information is available, it is forwarded promptly to the client for display. Otherwise, the central server retrieves the relevant information for the requested web page from the pertinent server. The relevant information is then processed by the annotation means to generate additional relevant computer information that can be incorporated to create an annotated version of the requested web page which includes additional displayable hypertext information. The central server then relays the additional relevant computer information to the client so as to allow the annotated version of the requested web page to be displayed. In addition, the central server can update the cache with information from the annotated version. The central server can also interact with different servers to collect and maintain statistical usage information. In handling its communications with various processing/storage entities, the operating system running behind the central server utilizes a pool of persistent threads and an independent task queue to improve the efficiency of the central server. The pool of threads are continually maintained and monitored by the operating system. Whenever a thread is available, the operating system identifies the next executable task in the task queue and assigns the available thread to such task so as to allow it to be executed. Upon conclusion of the task execution, the assigned thread is released back into the thread pool. An additional I/O queue for specifically handling input/output tasks can also be used to further improve the efficiency of the central server.

42 Claims, 7 Drawing Sheets

U.S. PATENT DOCUMENTS

| | | | |
|---|---|---|---|
| 5,179,702 A | 1/1993 | Spix et al. | |
| 5,754,771 A | 5/1998 | Epperson et al. | |
| 5,764,915 A | 6/1998 | Heimsoth et al. | |
| 5,774,668 A | 6/1998 | Choquier et al. | |
| 5,822,539 A | 10/1998 | van Hoff | |
| 5,822,720 A | 10/1998 | Bookman et al. | |
| 5,826,025 A | 10/1998 | Gramlich | |
| 5,877,759 A * | 3/1999 | Bauer | 719/317 |
| 5,928,323 A | 7/1999 | Gosling et al. | |
| 5,974,413 A | 10/1999 | Beauregard et al. | |
| 5,991,792 A | 11/1999 | Nageswaran | |
| 5,991,802 A | 11/1999 | Allard et al. | |
| 5,991,808 A | 11/1999 | Broder et al. | |
| 6,023,714 A | 2/2000 | Hill et al. | |
| 6,041,335 A | 3/2000 | Merritt et al. | |
| 6,052,730 A | 4/2000 | Felciano et al. | |
| 6,081,829 A | 6/2000 | Sidana | |
| 6,092,074 A | 7/2000 | Rodkin et al. | |
| 6,098,065 A | 8/2000 | Skillen et al. | |
| 6,105,044 A | 8/2000 | DeRose et al. | |
| 6,108,715 A | 8/2000 | Leach et al. | |
| 6,161,114 A | 12/2000 | King et al. | |
| 6,272,493 B1 | 8/2001 | Pasquali | |
| 6,339,131 B1 | 1/2002 | Cella et al. | |
| 6,463,440 B1 | 10/2002 | Hind et al. | |
| 6,484,156 B1 | 11/2002 | Gupta et al. | |
| 6,581,065 B1 | 6/2003 | Rodkin et al. | |
| 6,748,385 B1 | 6/2004 | Rodkin et al. | |
| 7,236,969 B1 | 6/2007 | Skillen et al. | |
| 2003/0120722 A1 * | 6/2003 | Forkner et al. | 709/203 |
| 2005/0050164 A1 * | 3/2005 | Burd et al. | 709/217 |

OTHER PUBLICATIONS

"Novel business uses of independently created hypertext links in the World Wide Web: Basic mechanism and examples," Schloss, R.J., System Sciences 1996, Proc. of the 29th Hawaii Intl. Conf., Jan. 3-6, 1996, pp. 137-146.

"Shared Web Annotations As a Platform for Third-Party Value-Added Information Providers: Architecture, Protocols, and Usage Examples," Technical Report CSDTR/DLTR, Martin Roscheisen, Computer Science Dept., Standard University.

Abandoned U.S. Appl. No. 09/524,046.

Abandoned U.S. Appl. No. 09/524,047.

* cited by examiner

PROCESSING TECHNIQUES FOR SERVERS HANDLING CLIENT/SERVER TRAFFIC AND COMMUNICATIONS

CROSS-REFERENCES TO RELATED APPLICATIONS

This application is a continuation of U.S. patent application Ser. No. 09/524,047 filed Mar. 13, 2000 now abandoned and is related to (1) U.S. patent application Ser. No. 09/021, 331, filed Feb. 10, 1998 and allowed to issue on Jul. 18, 2000 (U.S. Pat. No. 6,092,074), (2) U.S. patent application Ser. No. 09/476,758, filed Jan. 3, 2000, entitled AUGMENTING INFORMATION BY DYNAMIC INSERTION OF HYPERTEXT LINKS, (now abandoned) which claims the benefit of priority from U.S. Provisional Patent Application Ser. No. 60/114,712, filed Jan. 4, 1999, and (3) U.S. patent application Ser. No. 09/524,047, filed on Mar. 13, 2000, entitled SYSTEM FOR HANDLING CLIENT/SERVER TRAFFIC AND COMMUNICATIONS PERTAINING TO INSERTION AND UPDATING OF HYPERTEXT INFORMATION, all of which are hereby incorporated by reference as if set forth in full in this document.

BACKGROUND OF THE INVENTION

The present invention generally relates to processing techniques for a server handling client/server traffic and communications. More specifically, the present invention utilizes persistent threads and an independent task queue to improve the efficiency of servers. This invention is particularly suitable for use with servers handling client/server traffic and communications in a computer network such as the Internet.

The predominant way to access information on the Internet is through the use of a browser. A browser is a software program that allows a web surfer to view web pages accessible on the Internet. In order to properly display a web page on a computer screen, the underlying script which represents the web page must be written in a language that can be interpreted by the browser. Hypertext languages, which may include Hypertext Markup Language (HTML), Extended Markup Language (XML), or other forms of Standard Generalized Markup Language (SGML), are often used to accomplish this purpose. Put in simplified terms, the browser interprets a hypertext script, which essentially contains text and formatting commands, and displays the web page on the screen in accordance with those text and formatting commands. The web page, as displayed, may or may not contain any hypertext links to other web pages.

Many web users currently find a large number of existing web pages to be lacking in hyperlinks. Therefore, in addition to retrieving the hypertext script for a desired web page, it would be desirable to provide the capability to modify the original hypertext script to offer additional hyperlinks and functionality. One such invention which provides the foregoing desired capability is disclosed in the U.S. patent application Ser. No. 09/021,331, now U.S. Pat. No. 6,092,074. As disclosed therein, that particular invention is a method and apparatus for automatically providing additional hypertext anchor codes and destination addresses for a pre-existing web page. That invention, among other things, modifies the underlying hypertext script to produce an annotated version of the pre-existing web page that includes additional hypertext links and other functionality.

Since web pages are retrieved and viewed by web users during every second of every day at an astronomical rate, the task of generating an annotated web page each time a web page is accessed could become quite burdensome. From an efficiency standpoint, it is more efficient to retain a copy of the annotated web page for subsequent use. Otherwise, every time an annotation request is received from an user, regardless of the request frequency, all the processing steps have to be repeated starting from retrieving the original web page from the content server to producing the annotated web page. Therefore, it would be desirable to provide a system that can efficiently process and handle annotation requests.

By processing and handling the annotation requests in a more efficient manner, valuable time can be saved thereby allowing the web users to view their desired web pages more quickly.

Furthermore, under current practice, a web user usually subscribes for Internet access and other subscription services through an Internet service provider ("ISP"). FIG. 1 is a simplified block diagram showing a conventional configuration for Internet access. The ISP 12 acts as a gateway to allow a web user using a browser residing on a user computer 10 to access the Internet 14. When access to the Internet is needed, the web user using the user computer 10 contacts the ISP 12 to have the ISP 12 assign a temporarily IP address to the user computer 10. With the assigned IP address, the user computer 10 is then able to communicate with other computers on the Internet. For example, if a web user desires to retrieve a particular web page, the user computer 10 contacts the server 16 where the desired web page is located and the pertinent hypertext script for that web page is retrieved to the web user's browser on the user computer 10 to allow that web page to be displayed.

Since the use of a browser is the most preferred way to access information on the Internet, it would be safe to conclude that a high percentage of this Internet communication traffic is attributable to transfers of hypertext information. With the use of the Internet increasingly growing more popular among the general public, heavy Internet communication traffic is becoming a significant issue in connection with managing and hosting web servers. Therefore, it would be desirable to provide a system that can help reduce Internet communication traffic during the processing of annotation requests.

In addition, there is a constant need to improve the efficiency of a server servicing requests from a client over a computer network. An operating system running behind a server generally uses a pool of threads to control the number of executable requests. Such threads are "spawned" or generated by the server when a request requires execution and are terminated upon a request's completion. A thread represents an authorization without which a particular request cannot be executed by the server. The thread is a signal given by the operating system to ensure that there are sufficient resources from the system to allow a request to be executed.

Typically, a thread is assigned to a request exclusively until the request reaches its conclusion. Such exclusive assignment is often very wasteful when a request further comprises a number of sequential tasks. When one or more tasks within a request cannot be initiated or completed due to other system constraints, an assigned thread is occupied but not efficiently used, thereby rendering the server inefficient as well. Therefore, it would be desirable to provide processing techniques that are capable of improving the efficiency of a server servicing requests from a client.

SUMMARY OF THE INVENTION

The present invention relates to processing techniques for servers handling client/server traffic and communications pertaining to the delivery of hypertext information to a client. A system which is capable of processing annotation requests may include a central server for processing a request for a web page from a client, a cache for storing information relating to requests previously received from clients, and an annotation module for annotating the requested web page. The central server further includes a querying module for querying the cache to determine whether information relating to the request is present in the cache and an updating module for populating the cache with annotated information generated by the annotation module.

The system operates by receiving a request for a web page from a client. The cache is then queried by the querying module to determine whether information for the requested web page is available. If such information is available, it is forwarded promptly to the client for display. Otherwise, the central server directly retrieves the necessary information for the requested web page from the pertinent server connected to the Internet. The web page information is then processed by the annotation module to generate additional hypertext information which can be used to create an annotated version of the requested web page which includes additional displayable hypertext information. The central server then relays the additional hypertext information to the client to allow the client to generate an annotated version of the requested web page for display. In addition, the central server can also update the cache with the additional hypertext information.

In order to optimize the performance of the central server, a pool of persistent threads and an independent task queue are used to expedite the processing of the annotation requests. Optionally, an additional independent I/O queue can also be used to further enhance the performance of the central server.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DESCRIPTION OF THE SPECIFIC EMBODIMENTS

The present invention generally relates to processing techniques for a server handling client/server traffic and communications. More specifically, the present invention utilizes persistent threads and an independent task queue to improve the efficiency of servers capable of processing annotation requests from a client to a server over a computer network such as the Internet.

The annotation process takes place as follows. An "Annotator" first parses the text of the original web page and identifies certain keywords or character strings for subsequent annotation. The Annotator then matches the keywords or character strings in the web page text with predefined words in a database. Additional hyperlinks and other related information associated with these keywords or character strings are then retrieved from a database and passed onto a user computer, in particular, a browser on the user computer, to allow the user computer to incorporate and display the additional hyperlinks and related information in a modified web page. An important end product generated by the Annotator is additional hypertext information that can be incorporated to form a modified hypertext script which allows a browser to display the annotated web page having the added hyperlinks and functionality. In a preferred configuration, the Annotator does not directly access the databases containing the predefined keywords or character strings and their associated additional hyperlinks and other related information. Instead, during startup of the Annotator, copies of those databases are loaded into a memory storage area which can be more efficiently accessed by the Annotator. Those databases are updated on a regular basis by computer programs designed to "crawl" the Internet for the latest contents and information. The process of annotating a pre-existing web page to provide additional hyperlinks and functionality is further described in detail in U.S. patent application Ser. No. 09/021,331, now U.S. Pat. No. 6,092,074.

Figure 1:
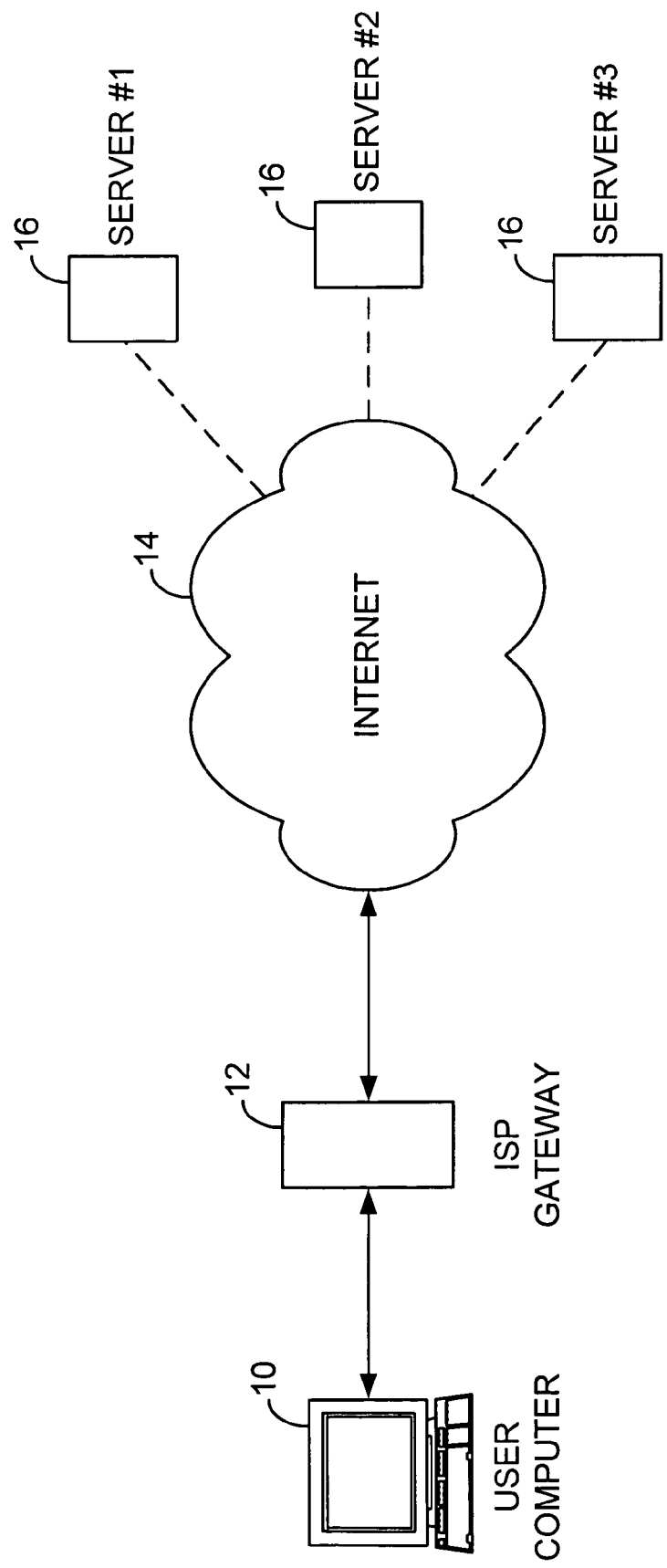
FIG. 1 is a simplified block diagram showing a conventional configuration for Internet access.
Figure 2:
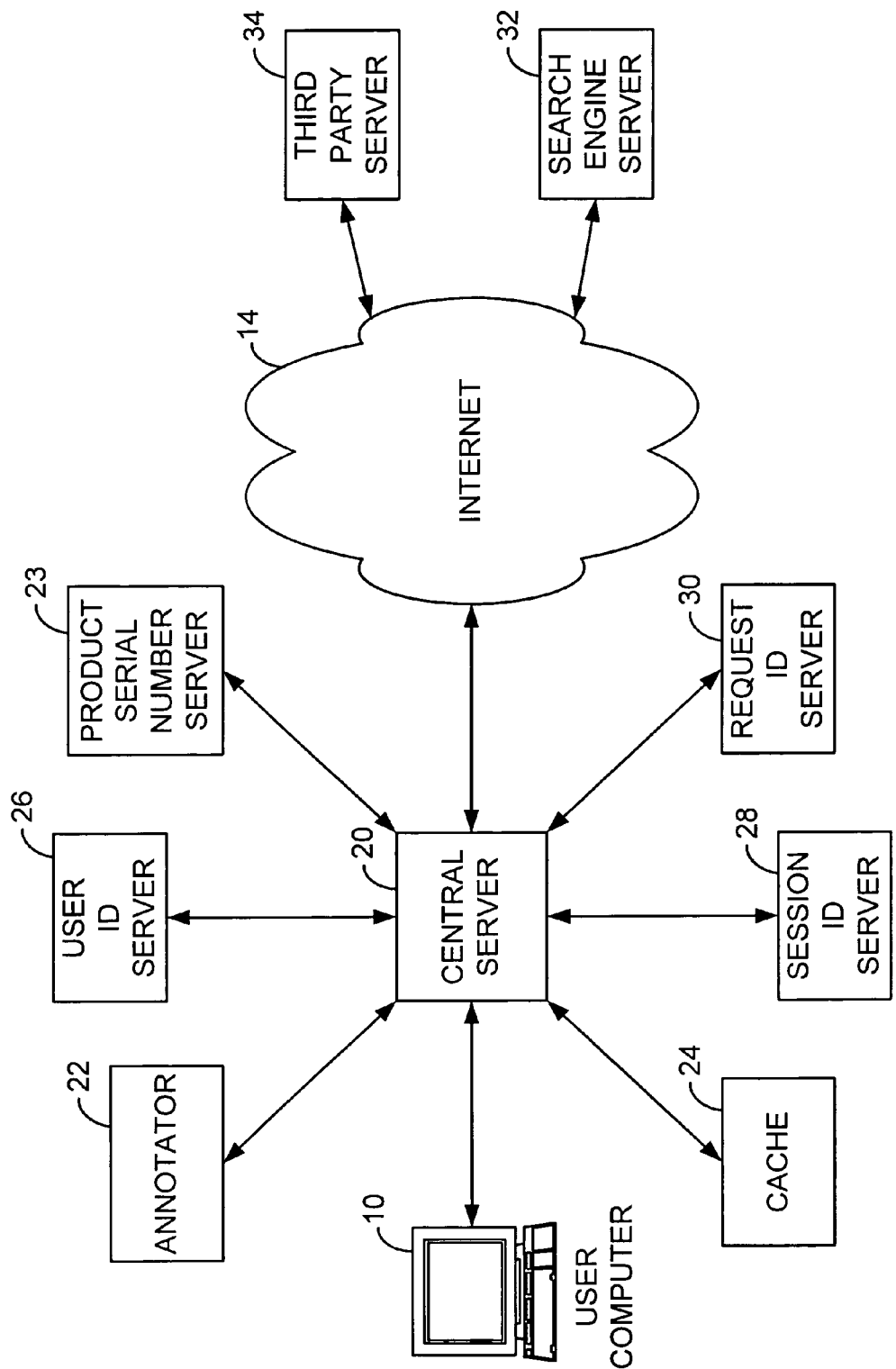
FIG. 2 is a simplified conceptual diagram illustrating the overall system architecture of one embodiment a system in accordance with the present invention.

FIG. 2 is a simplified conceptual diagram illustrating the overall system architecture of one embodiment of a computer system in accordance with the present invention. A central server 20 or computer is connected to a number of different processing/storage entities. A number of web users' computers, such as a user computer 10, can be connected to the central server 20 for any one of a number of purposes, for example, forwarding an annotation request for an annotated web page.

In order to process the annotation request, the central server 20 is in communication with various different processing/storage entities, for example, the Annotator 22, a cache 24, a user ID server 26, a session ID server 28, a request ID server 30, a product serial number server 23, a search engine search 32, and a third party server 34.

Generally, a server, or file server, refers to a computer system with data storage that allows different users to access the data storage via a computer network. In a client/server interaction, a client forwards a request. The server accepts the client's request, performs the associated operation (e.g., open, close, read, write or find etc.), and returns a response to the client.

As previously mentioned, the Annotator 22 is a software program that is capable of providing hyperlinks for a web page on a dynamic basis. The Annotator 22 may receive as input a hypertext script, preferably in HTML format, which can be used to accordingly generate the original web page. The hypertext script is then modified by the Annotator 22 to include hyperlinks which are displayable in the annotated web page. The modified hypertext script may be outputted in XML format. The details regarding the features and operations of the Annotator 22 may be found in the U.S. patent application Ser. No. 09/021,331, now U.S. Pat. No. 6,092, 074.

The cache 24 is generally a storage area where the relevant computer information, such as modified hypertext scripts and destination page information (e.g. URLs), for the annotated versions of previously requested web pages are kept for quick retrieval. Preferably, the contents of the cache 24 are indexed by URLs. Such relevant computer information may be organized using the XML format and syntax. Using conventional relational database techniques, the cache 24 may also be implemented in the form of a database.

Since the size of the cache 24 may be limited, the cache 24 may be updated periodically to include the relevant computer information for only selected annotated versions. The contents of the cache 24 may be updated based on a number of different criteria including, but not limited to, the most recently requested entries, the most frequently requested entries, and the "stale" entries etc. For example, if the cache 24 is updated based on a most-recently-requested basis (i.e., a first-in-first-out basis), then the relevant computer information for the last requested web pages is retained in the cache 24 based on a reverse chronological order; if the cache 24 is updated based on a most-frequently-requested basis, then the relevant computer information for the most frequently accessed web pages is retained; and if the update is done on the basis of "stale" entries, then the "obsolete" relevant computer information, determined based on a preset time expiration, is removed from the cache 24. Various other updating criteria are well known in the art.

The session ID server 28, the request ID server 30, the user ID server 26, and the product serial number server 23 are databases for respectively storing session IDs, request IDs, user IDs, and product serial numbers. These different types of IDs and numbers are assigned by the central server 20 for various purposes, as will be described further below.

Preferably, in order to improve efficiency, the central server 20 retrieves a large number of available IDs/numbers, for example, in blocks of one thousand, every time one of these servers 23, 26, 28 or 30 is accessed for purposes of retrieving the next available IDs/numbers. The retrieval of large blocks of available IDs/numbers per access reduces the number of times the servers 23, 26, 28 or 30 have to be accessed. The central server 20 can exhaust the blocks of IDs/numbers before the servers 23, 26, 28 or 30 need to be accessed again for purposes of retrieving available IDs/numbers.

The central server 20 maintains a number of logs for each of these IDs/numbers to separately keep track of the available IDs/numbers retrieved and the IDs/numbers already assigned. Periodically, the central server 20 interacts with the servers 23, 26, 28 and 30 to synchronize their information.

The central server 20 can also retrieve information in a number of ways. For instance, when a user desires to search for information on a particular term, the central server 20 can first look to the memory storage area (not shown) being used by the Annotator 22 as mentioned above to determine if any information is available from such area. Alternatively, if no information is available from the memory storage area, the central server 20 can contact a search engine (not shown) which resides on the search engine server 32 and automatically provide the search term to the search engine to have it conduct the search.

It should be understood that the physical location of the various different processing/storage entities mentioned above may vary depending on the particular configuration desired and system constraints imposed during implementation. For example, the central server 20 and a number of the processing/storage entities such as the Annotator 22, the cache 24, the session ID server 28, the request ID server 30 and the user ID server 26 may reside on the same machine. It should also be understood that these various different processing/storage entities may be combined or further divided into additional components depending on the design or constraints of the system.

It should be further understood that the central server 20, the user computer 10 and each of the various processing/storage entities are individually scalable. In other words, there may be multiple instances of each one of the elements shown in the overall system architecture in FIG. 2. For example, a single central server 20 may communicate with a large network of user computers 10 on a continual basis depending on the needs of the web users and the bandwidth of the communication network, a single central server 20 may also communicate with one or more Annotators 22, or alternatively, one Annotator 22 may be called upon by various central server 20 at different times to perform the necessary annotation.

Figure 3:
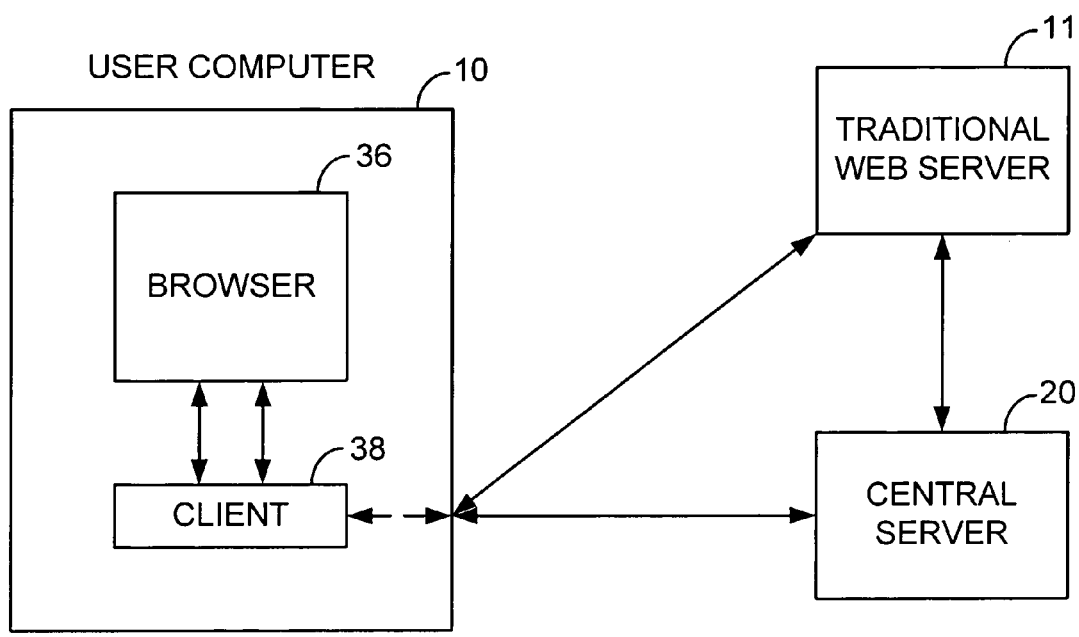
FIG. 3 is a simplified conceptual diagram illustrating the logical connection between a user computer, a traditional web server, and a server.

FIG. 3 is a simplified conceptual diagram illustrating the logical connection between a user computer 10, a traditional web server 11, and the central server 20. The user computer 10 includes a browser 36 and a client 38. The browser 36 is generally a software program, such as the Netscape Navigator and the Microsoft Internet Explorer, which allows web pages accessible on the Internet to be viewed. The browser 36 fetches the hypertext script for the requested web page from the traditional web server 11, interprets the text and formatting commands that the hypertext script contains, and displays the web page, properly formatted, on the screen. The client 38 is generally a companion to the browser 36 which is capable of handling communications between the browser 36 and the central server 20. During normal operation, upon a user requesting a web page, the user computer 10 sends out parallel requests for that web page to both the traditional web server 11 and the central server 20. The traditional web server 11 then forwards the relevant hypertext information for the requested web page to the user computer 10. Concurrently, upon receipt of a request from the client 38, the central server 20 coordinates with various processing entities to process the request. The pertinent information generated in response to the request is returned by the central server 20 to the client 38 which, in turn, combines this information with information received from the traditional web server 11 and then relays the combined information to the browser 36 so as to allow the user computer 10 to display the results.

Figure 4:
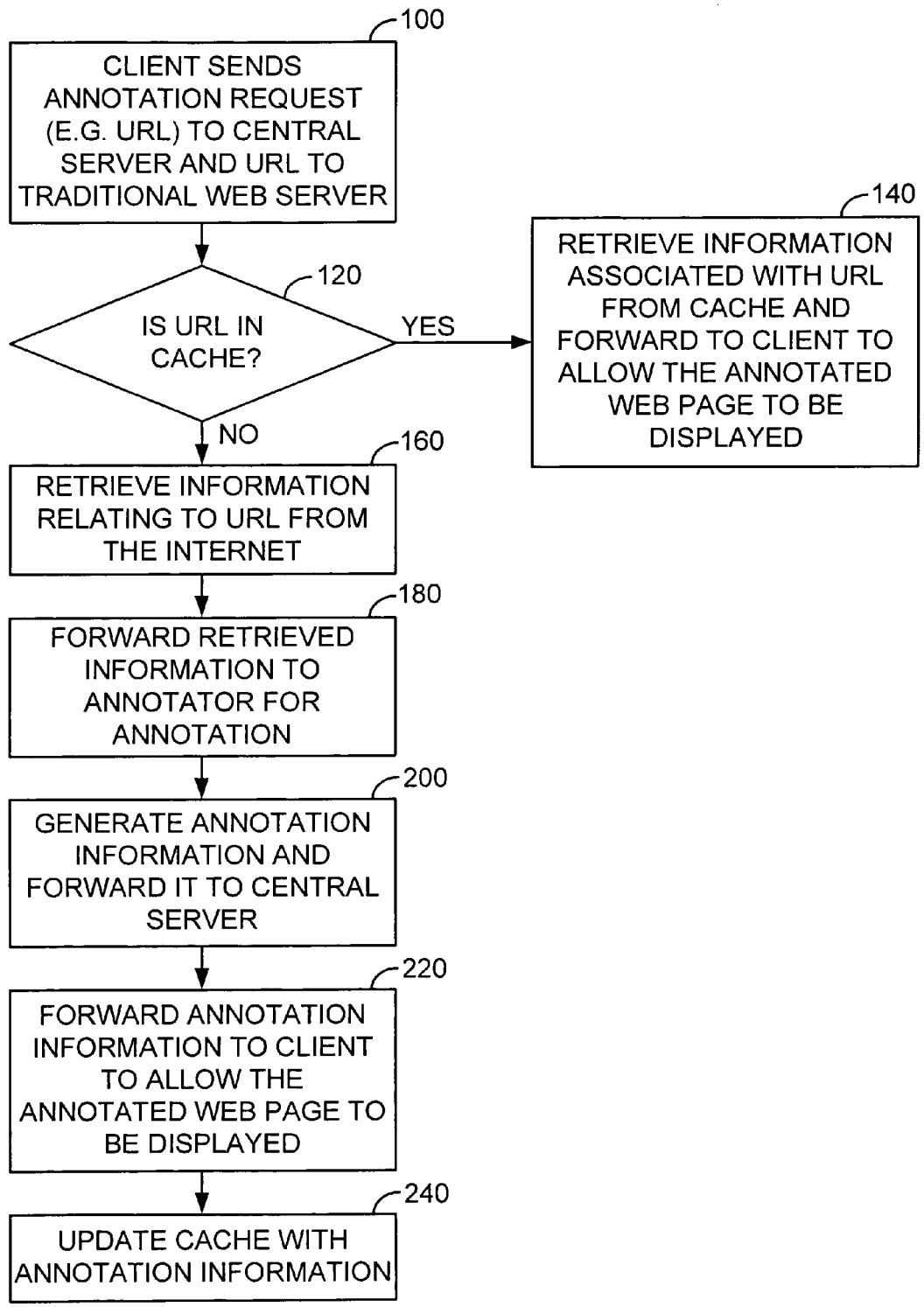
FIG. 4 illustrates a simplified process flow for a central server in accordance with the present invention.

For example, an annotation request issued by a web user via the user computer 10 is processed as follows. FIG. 4 illustrates a process flow for a central server 20 in accordance with the present invention.

At step 100, the central server 20 receives from the client 38 the destination page information, preferably a URL, for a desired web page. The client 38 also fetches a copy of the desired web page from the traditional web server 11. Generally, such destination page information can be transmitted from the client 38 to the central server 20 and the traditional web server 11 in a number of formats commonly known in the art.

At step 120, using the URL provided, the central server 20 queries the cache 24 to determine whether the corresponding relevant computer information, such as additional hypertext information, associated with the specified URL for the requested web page is available in the cache 24.

At step 140, if the corresponding relevant computer information is found in the cache 24, such information is retrieved by the central server 20 and then forwarded to the client 38. The client 38, in turn, integrates such information with information received from the traditional web server 11 and subsequently relays the integrated information, in the form of a modified hypertext script, to the browser 36 to allow the annotated web page to be displayed in the proper format.

If the computer information associated with the specified URL is not found in the cache 24, at step 160, the central server 20 contacts the traditional web server 11 which has the web page referenced by the URL provided by the client 38. The computer information, such as the hypertext script, for that particular web page is then sent back to the central server 20.

At step 180, the central server 20 forwards the computer information for the specified URL, generally in HTML format, to the Annotator 22 for annotation.

At step 200, the Annotator 22 performs the intended annotation resulting in additional relevant computer information that can be incorporated to form a modified hypertext script which contains displayable additional hyperlinks. The Annotator 22 then transmits the additional relevant computer information, preferably coded in the XML format, to the central server 20.

At step 220, the central server 20 relays the additional relevant computer information to the client 38. The client 38 then integrates the additional relevant computer information with information received from the traditional web server 11 to form a modified hypertext script. The modified hypertext script is then forwarded to the browser 36. Since the input to the browser 36 is a modified hypertext script, an annotated web page having additional hyperlinks is now shown to the web user.

At step 240, the cache 24 is populated and updated with the additional relevant computer information associated with the specified URL. Alternatively (not shown), the step of populating and updating the cache 24 can be performed concurrently with or before step 220 above.

In accordance with the present invention, the use of the cache 24 expedites the processing of requests received from the client 38. When the relevant computer information for a specified URL is available in the cache 24, such information is promptly forwarded to the client 38 by the central server 20. Therefore, a web user is able to view the desired annotated web page with minimal processing delay.

Furthermore, there is no need to always contact the server containing the requested web page to retrieve the needed information and the Annotator 22 is not always called upon to produce the desired modified hypertext script for every requested web page. This clearly reduces communication traffic and frees up the central server 20 to allow it to perform other necessary tasks, thereby rendering the central server 20 more efficient.

Additional features and functionality of the present invention will now be described. These additional features and functionality generally relate to the assigning and collecting of identifying information.

Each client 38 located on a user computer 10 contains certain identifying information. This identifying information is generally used by the central server 20 to monitor the usage and security of the system. In one embodiment, the client 38 contains a distribution tag, a product serial number, and a user ID.

The distribution tag contains information on the identity of the source which distributed the client 38 to the user computer 10. This information is used mainly to track the distribution of clients 38 for marketing purposes.

The product serial number is a unique number specific to each user computer 10. This number is assigned to a particular user computer 10 during the first communication between the client 38 and the central server 20 after the initial installation of the client 38 onto the user computer 10. As mentioned before, a new product serial number is assigned from a block of available product serial numbers previously retrieved from the product serial number server 23 and kept by the central server 20.

The user ID is an identification number assigned to each user. The user ID is both machine-specific and user-specific. This two-level specificity permits different users to access and use the client 38 on the same user computer 10. Similarly, the user ID is assigned to a particular user during the first communication between the client 38 and the central server 20 after the initial installation of the client 38 onto the user computer 10. Thereafter, each time a client 38 establishes a connection with the central server 20, the user ID is transmitted by the client 38 to the central server 20 together with other pertinent information. Likewise, a new user ID is assigned from a block of available user IDs previously retrieved from the user ID server 26 and kept by the central server 20.

Figure 5:
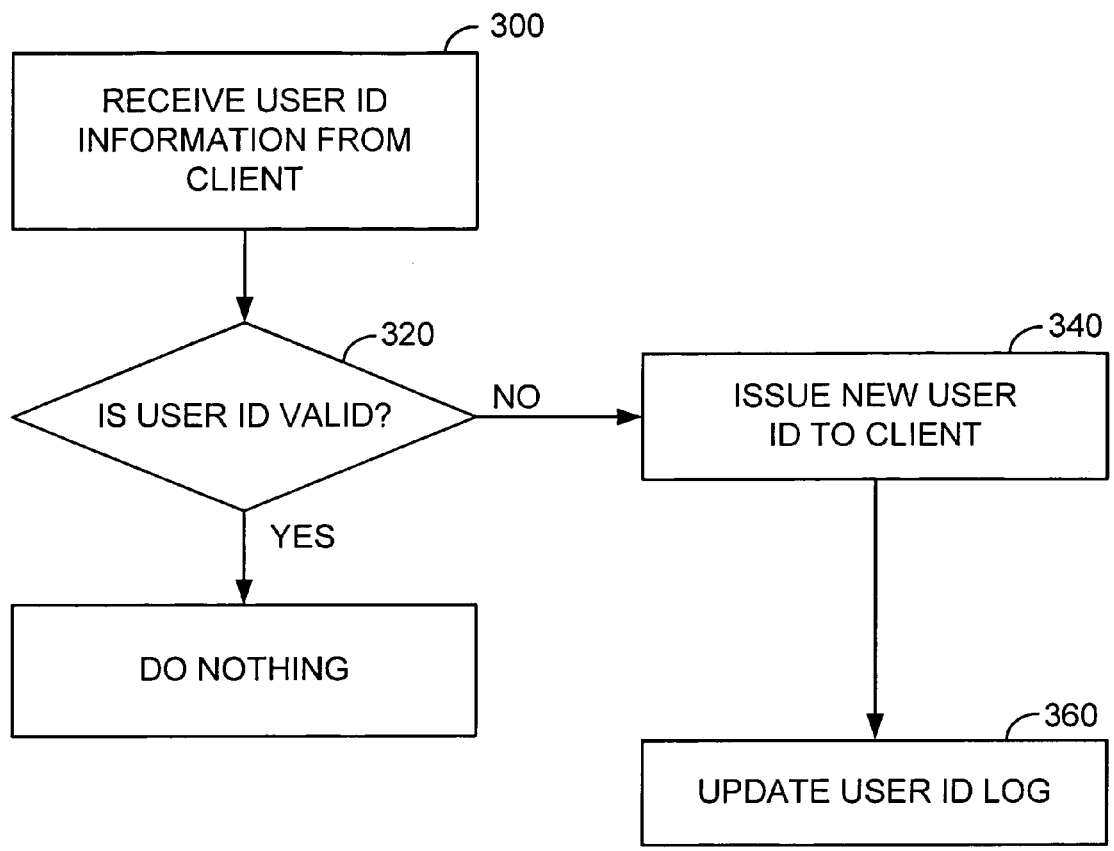
FIG. 5 illustrates a simplified process flow for checking a user ID in accordance with the present invention.

FIG. 5 illustrates a simplified process flow for checking a user ID in accordance with the present invention. At step 300, upon establishing a connection, the client 38 provides a user ID to the central server 20.

At step 320, the central server 20 determines whether the user ID provided by the client 38 is valid. If the user ID is not valid, at step 340, a new user ID is generated by the user ID server 26 and issued to the client 38. At step 360, the user ID log is updated to reflect the new activity.

A session ID is issued by the central server 20 to a client 38 when the client 38 initiates contact to establish a session with the central server 20. Thereafter, all communications exchanged between the client 38 and the central server 20 during that session are marked with that assigned session ID. Similarly, a new session ID is assigned from a block of available session IDs previously retrieved from the session ID server 26 and kept by the central server 20.

In the event that a particular session has remained idle for a predetermined period time, i.e., there is no communication between the client 38 and the central server 20 for an extended period of time, for example, twenty minutes, despite the client 38 maintaining a connection to the central server 20, the client 38 may invalidate the currently assigned session ID and not include this invalidated session ID in future communications with the central server 20.

Figure 6:
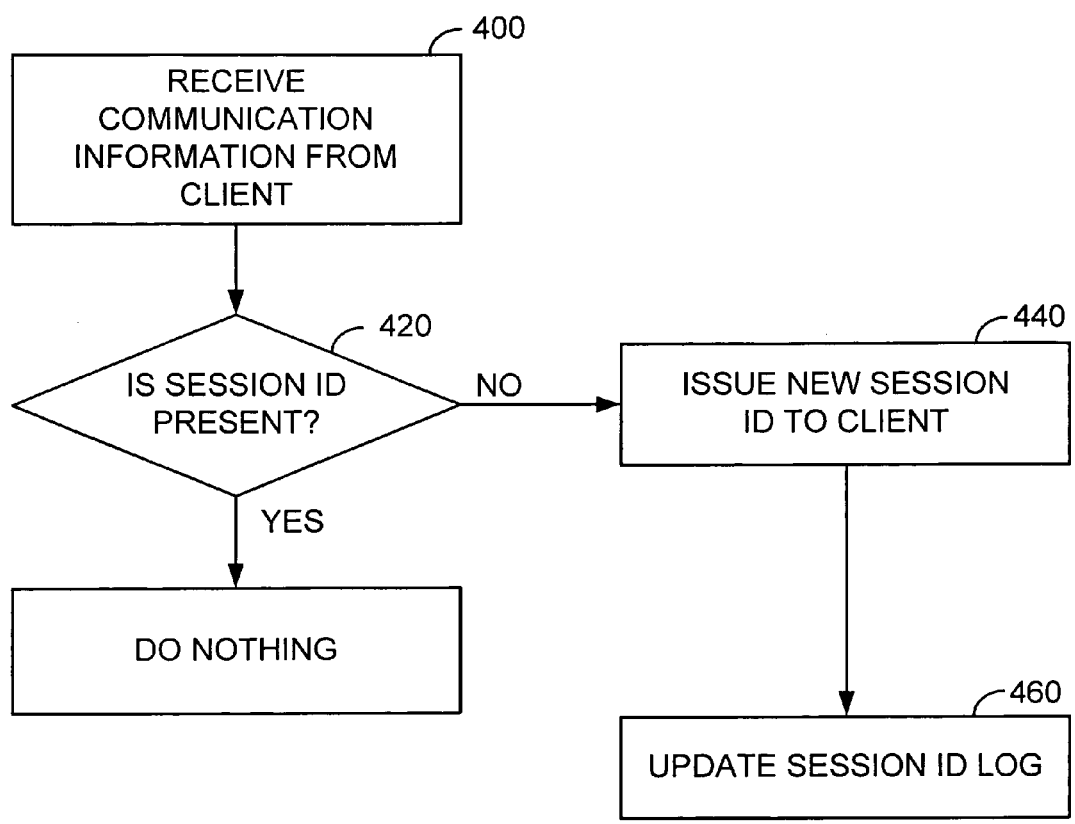
FIG. 6 illustrates a simplified process flow for checking a session ID in accordance with the present invention.

Since a currently assigned session ID may be invalidated by the client 38 due to inactivity during a session, the central server 20 may want to confirm the presence of a session ID. FIG. 6 illustrates the process flow for checking a session ID. At step 400, each time a communication is sent from the client 38, a session ID, if it has not been invalidated, is also transmitted to the central server 20 together with other pertinent information. At step 420, upon receiving the communication from the client 38, the central server 20 checks to see if there is a session ID associated with that communication. At step 440, in the event that the session ID is not present, due to, for example, invalidation because of inactivity, the central server 20 assigns a new session ID to the client 38 and, at step 460, the session ID log is updated to reflect the new activity.

Furthermore, the central server 20 may assign a unique request ID for each annotation request made by the client 38. In other words, each time a client 38 supplies the central server 20 with a URL associated with a web page for annotation purposes, a request ID is assigned to that URL. A new request ID is assigned from a block of available request IDs previously retrieved from the request ID server 30 and kept by the central server 20.

By maintaining a list of issued request IDs for a particular client 38, a history of activity can be established. The request IDs already assigned may be stored in a batch file for subsequent processing. Periodically, the central server 20 may transfer the data in the batch file together with other identifying information to a request ID server 30 for storage and other purposes.

As described above, the central server 20 is the central point for coordinating the performance of various functions. In order to optimize the efficiency of the central server 20, the present invention utilizes a pool of persistent threads and an independent task queue to expedite the processing of requests from the user computer 10. The pool of persistent threads is maintained by the operating system running on the central server 20 at all times, i.e., these threads are not "spawned" or generated only at the time when they are needed and are not terminated when they are no longer needed. By eliminating the thread generation and termination process, the operating system is better able to allocate its resources to perform other functions for the central server 20.

The operating system uses an independent task queue and the persistent thread pool to reduce any thread utilization inefficiency. As mentioned above, the operating system of the central server 20 maintains a pool of persistent threads. Whenever a thread from the thread pool is available, the available thread is assigned to a task only when such task is ready for execution. The thread pool and the task queue are independent of one another; in other words, an available thread is assigned to an execution-ready task without regard to the nature of such task.

The independent task queue is made up of tasks that need to be executed in order to carry out the various functions of the central server 20. For example, in processing an annotation request from the user computer 10, the request is broken down into its constituent tasks. Some tasks might include retrieving the relevant computer information, such as the URL, for the desired web page, checking the cache 24 for availability of relevant computer information, retrieving hypertext information for the desired web page, and annotating the desired web page, etc.

The order of execution for the tasks within the task queue is generally sequential, i.e., first-in-first-out ("FIFO"). This FIFO order, however, is subject to contingent and other execution conditions. It should be understood that many requests can be broken down into their respective constituent tasks and that these tasks can be channeled into one or more task queues for processing. A task located at the beginning of the task queue but is not ready for execution due to other constraints, for example, the unavailability of certain prerequisites, such as the results from the completion of another task, is bypassed until it is ready to run. Alternatively, a task that is not ready to be executed may be re-prioritized to await its turn for execution.

Figure 7:
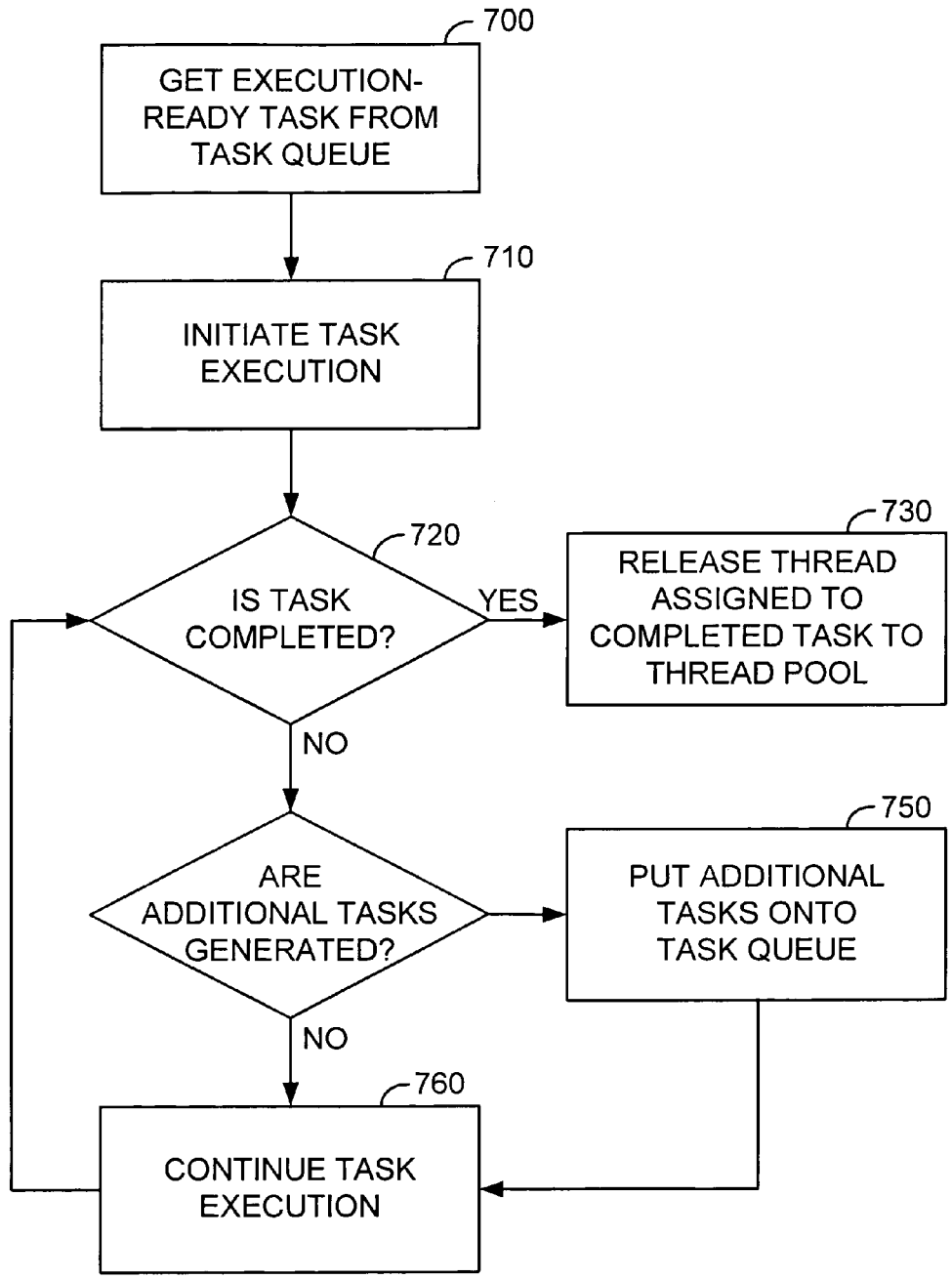
FIG. 7 illustrates a simplified process flow of a thread used in accordance with the present invention.

FIG. 7 illustrates a simplified process flow of a thread used in accordance with the present invention. An available thread is first identified from the thread pool. At step 700, the available thread is assigned to an execution-ready task from the task queue. At step 710, the execution of the task with the assigned thread is initiated. At step 720, the task is checked to determine whether it has been completed. If the execution of the task has concluded, at step 730, the assigned thread is released back into the thread pool for subsequent assignment. However, if the task is not yet completed, at step 740, the operating system checks the execution of the task to determine whether any additional tasks have been generated. At step 750, if additional tasks have been generated, these additional tasks are put onto the task queue to await their turn for execution. In any event, regardless of whether any additional tasks have been generated, the execution of the task continues at step 760. The foregoing cycle repeats starting with step 720 until the execution of the task is completed.

It should be understood that FIG. 7 is merely illustrative of the operation of a single thread and that many threads can be performing their respective functions concurrently in cooperation with the independent task queue.

By grouping tasks into a task queue and maintaining a thread pool which is independent from the task queue, the operating system is able to improve its utilization of system resources thereby allowing the central server 20 to perform its functions more efficiently. A thread is no longer tied up unnecessarily due to unexecutable tasks within a request. For example, if one thread is assigned to a request for the entire duration of the request's execution, valuable system resources would be wasted if any one of the constituent tasks, such as the step of retrieving the hypertext information of the desired web page, involves an excessive amount of idle time. Under the present configuration, by assigning a thread to an executable task, excessive amounts of idle time can be avoided. Therefore, a higher percentage of time is spent by a thread in executing tasks rather than sitting idle.

To further improve the efficiency of task execution, the present invention may also include an independent input/output ("I/O") queue. The I/O queue functions as follows. When a task is identified as performing strictly input and/or output functions, this I/O task is put on the I/O queue to wait for execution. Since the tasks in the I/O queue only perform input and/or output functions, they are usually executed at a much higher rate due to their relatively few dependencies on other parameters. Furthermore, the tasks in the I/O queue are generally executed in a parallel or concurrent manner.

Once a task in the I/O queue has been executed, the task queue is notified and tasks in the task queue which require the results of the executed I/O task become executable. Based on empirical data, it has been shown that I/O tasks are often the bottlenecks in task execution. Therefore, by implementing a separate I/O queue, the efficiency of a server is likely to improve.

It should be understood that the number of thread pools, task queues, and I/O queues may vary individually based on the design and constraints of the system. It will also be appreciated by those skilled in the art that various elements of the present invention, such as the central server 20, the cache 24, and the Annotator 22, as described herein are scalable and that the number of each element may be increased individually depending upon the needs of the system.

Conventional techniques and hardware which will be apparent to those skilled in the art may be used for communicating data, between and within, the server and the client. Moreover, the invention may be adapted for use with various software programming systems. For example, while the use of XML has been mentioned in an example embodiment, other programming languages and tools may be used.

Additionally, while the invention has been described for use in connection with the Internet, the invention may be adapted or use with virtually any computer network, including but not limited to, intranets, local areas networks, and wide area networks.

Although the invention has been described in connection with various specific embodiments, those skilled in the art will appreciate that numerous adaptations and modifications may be made thereto without departing from the spirit and scope of the invention as set forth in the claims.

The scope of the invention is indicated by the appended claims, and not the foregoing description. All changes which come within the meaning and range of equivalency of the claims are to be embraced within their scope.

What is claimed is:

1. A computer system for optimizing processing of an annotation request from a client, comprising:
   a request processor configured to receive said annotation request from said client, to query a memory to find relevant information corresponding to said annotation request, and to break said annotation request down into a plurality of constituent tasks if said relevant information is not found;
   a task queue for storing the plurality of constituent tasks that need to be performed for said annotation request, wherein said plurality of constituent tasks includes annotating a retrieved web page with additional hyperlinks;
   a thread controller for maintaining a plurality of threads;
   a thread assignor for assigning said plurality of threads to said plurality of constituent tasks in said task queue; and
   a task executer for concurrently executing the plurality of constituent tasks in the respective plurality of threads to completion on the request processor.

2. A computer system according to claim 1, wherein said plurality of threads is independent from said plurality of constituent tasks stored in said task queue.

3. A computer system according to claim 1, wherein said plurality of threads is persistent.

4. A computer system according to claim 1, wherein said plurality of constituent tasks is arranged in a substantially first-in-first-out basis within said task queue.

5. A computer system according to claim 1, wherein when a thread is available for assignment, said thread is assigned to a constituent task when said constituent task is ready for execution.

6. A computer system according to claim 5, wherein said assigned thread is released upon conclusion of said constituent task.

7. A computer system according to claim 1, wherein said plurality of constituent tasks further includes retrieving information pertaining to said annotation request from one or more sources.

8. A computer system according to claim 7, wherein said one or more sources include the Internet.

9. A computer system according to claim 1, wherein said plurality of constituent tasks includes updating a cache with annotated information.

10. A computer system according to claim 1, further comprising:
    a I/O queue for storing a plurality of I/O tasks identified from said plurality of constituent tasks, wherein said plurality of I/O tasks only perform input and/or output functions.

11. A computer system according to claim 10, wherein two or more of said plurality of I/O tasks are executed in a parallel manner.

12. A computer system according to claim 10, wherein said task queue is notified upon completion of each of said plurality of I/O tasks.

13. A computer system according to claim 12, wherein upon said notification one or more of said plurality of constituent tasks which require results from said completed I/O tasks are rendered ready for execution.

14. A computer system for optimizing processing of an annotation request from a client, comprising:
    a request processor configured to receive said annotation request from said client, to query a memory to find relevant information corresponding to said annotation request, and to break said annotation request down into a plurality of constituent tasks if said relevant information is not found;
    a task queue for storing the plurality of constituent tasks that need to be performed for said annotation request, wherein said plurality of constituent tasks includes checking a cache to determine whether information pertaining to said annotation request is present in said cache;
    a thread controller for maintaining a plurality of threads;
    a thread assignor for assigning said plurality of threads to said plurality of constituent tasks in said task queue; and
    a task executer for concurrently executing the plurality of constituent tasks in the respective plurality of threads to completion on the request processor.

15. A computer system according to claim 14, wherein said plurality of threads is independent from said plurality of constituent tasks stored in said task queue.

16. A computer system according to claim 14, wherein said plurality of threads is persistent.

17. A computer system according to claim 14, wherein said plurality of constituent tasks is arranged in a substantially first-in-first-out basis within said task queue.

18. A computer system according to claim 14, wherein when a thread is available for assignment, said thread is assigned to a constituent task when said constituent task is ready for execution.

19. A computer system according to claim 18, wherein said assigned thread is released upon conclusion of said constituent task.

20. A computer system according to claim 14, wherein said plurality of constituent tasks further includes retrieving information pertaining to said annotation request from one or more sources.

21. A computer system according to claim 20, wherein said one or more sources include the Internet.

22. A computer system according to claim 14, wherein said plurality of constituent tasks includes updating a cache with annotated information.

23. A computer system according to claim 14, further comprising:
    a I/O queue for storing a plurality of I/O tasks identified from said plurality of constituent tasks, wherein said plurality of I/O tasks only perform input and/or output functions.

24. A computer system according to claim 23, wherein two or more of said plurality of I/O tasks are executed in a parallel manner.

25. A computer system according to claim 23, wherein said task queue is notified upon completion of each of said plurality of I/O tasks.

26. A computer system according to claim 25, wherein upon said notification one or more of said plurality of constituent tasks which require results from said completed I/O tasks are rendered ready for execution.

27. A computer system for optimizing processing of an annotation request, comprising:
    a request processor configured to receive said annotation request from a client, to query a memory to find relevant information corresponding to said annotation request, and to break said annotation request down into a plurality of requisite tasks needed to execute said annotation request if said relevant information is not found, wherein said plurality of requisite tasks includes annotating a retrieved web page with additional hyperlinks;
    a task queue for storing the plurality of requisite tasks needed to execute said annotation request;

a thread controller for controlling a thread pool having a plurality of threads, wherein said thread controller assigns said plurality of threads from said thread pool to said plurality of requisite tasks in said task queue; and a task executor for concurrently executing the plurality of requisite tasks in the respective plurality of threads to completion on the request processor.

28. A computer system according to claim 27, said thread pool is independent of said plurality of requisite tasks.

29. A computer system according to claim 27, wherein said assigned thread is released back into said thread pool for subsequent assignment when the execution of said execution-ready requisite task is completed.

30. A method for optimizing processing of an annotation request received from a client at a request processor, comprising the steps of:

receiving said annotation request from said client;

querying a memory to find relevant information corresponding to said annotation request;

breaking said annotation request down into a plurality of constituent tasks needed to complete the execution of said annotation request if said relevant information is not found, wherein said plurality of constituent tasks includes annotating a retrieved web page with additional hyperlinks;

storing said plurality of constituent tasks into a task queue;

maintaining a plurality of threads assignable to said plurality of constituent tasks;

assigning said plurality of threads to said plurality of constituent tasks in said task queue; and executing concurrently said plurality of constituent tasks in the respective plurality of threads to completion on the request processor.

31. A method according to claim 30, further comprising the steps of:

identifying a plurality of I/O tasks from said plurality of constituent tasks;

storing said plurality of I/O tasks into an I/O queue, separate from the task queue; and executing two or more of said plurality of I/O tasks in a parallel manner.

32. A method according to claim 31, further comprising the step of:

rendering one or more constituent tasks which require results from said executed I/O tasks ready for execution.

33. A method according to claim 30, wherein said plurality of threads is persistent.

34. A method according to claim 30, wherein said assigning of said available thread to said constituent task is independent of the nature of said constituent task.

35. A computer system for optimizing processing of an annotation request, comprising:

a request processor configured to receive said annotation request from a client, to query a memory to find relevant information corresponding to said annotation request, and to break said annotation request down into a plurality of requisite tasks needed to execute said annotation request if said relevant information is not found, wherein said plurality of requisite tasks includes checking a cache to determine whether information pertaining to said annotation request is present in said cache;

a task queue for storing the plurality of requisite tasks needed to execute said annotation request;

a thread controller for controlling a thread pool having a plurality of threads, wherein said thread controller assigns said plurality of threads from said thread pool to said plurality of requisite tasks in said task queue; and a task executor for concurrently executing the plurality of requisite tasks in the respective plurality of threads to completion on the request processor.

36. A computer system according to claim 35, said thread pool is independent of said plurality of requisite tasks.

37. A computer system according to claim 35, wherein said assigned thread is released back into said thread pool for subsequent assignment when the execution of said execution-ready requisite task is completed.

38. A method for optimizing processing of an annotation request received from a client at a request processor, comprising the steps of:

receiving said annotation request from said client;

querying a memory to find relevant information corresponding to said annotation request;

breaking said annotation request down into a plurality of constituent tasks needed to complete the execution of said annotation request if said relevant information is not found, wherein said plurality of constituent tasks includes checking a cache to determine whether information pertaining to said annotation request is present in said cache;

storing said plurality of constituent tasks into a task queue;

maintaining a plurality of threads assignable to said plurality of constituent tasks;

assigning said plurality of threads to said plurality of constituent tasks in said task queue; and executing concurrently said plurality of constituent tasks in the respective plurality of threads to completion on the request processor.

39. A method according to claim 38, further comprising the steps of:

identifying a plurality of I/O tasks from said plurality of constituent tasks;

storing said plurality of I/O tasks into an I/O queue, separate from the task queue; and executing two or more of said plurality of I/O tasks in a parallel manner.

40. A method according to claim 39, further comprising the step of:

rendering one or more constituent tasks which require results from said executed I/O tasks ready for execution.

41. A method according to claim 38, wherein said plurality of threads is persistent.

42. A method according to claim 38, wherein said assigning of said available thread to said constituent task is independent of the nature of said constituent task.

* * * * *